United States Patent
Tompkins

(10) Patent No.: US 8,482,287 B2
(45) Date of Patent: Jul. 9, 2013

(54) METHOD OF DETERMINING ELECTRICAL ANISOTROPY IN A SUBSURFACE FORMATION

(75) Inventor: Michael John Tompkins, San Francisco, CA (US)

(73) Assignee: Shell Oil Company, Houston, TX (US)

( * ) Notice: Subject to any disclaimer, the term of this patent is extended or adjusted under 35 U.S.C. 154(b) by 287 days.

(21) Appl. No.: 12/666,329

(22) PCT Filed: Jul. 1, 2008

(86) PCT No.: PCT/US2008/068893
§ 371 (c)(1),
(2), (4) Date: Nov. 17, 2010

(87) PCT Pub. No.: WO2009/006464
PCT Pub. Date: Jan. 8, 2009

(65) Prior Publication Data
US 2011/0050231 A1    Mar. 3, 2011

Related U.S. Application Data

(60) Provisional application No. 60/947,837, filed on Jul. 3, 2007.

(51) Int. Cl.
*G01V 3/02* (2006.01)
(52) U.S. Cl.
USPC ............ 324/334; 324/332; 324/365; 324/357
(58) Field of Classification Search
USPC .......... 324/221, 303, 323–343, 346, 351–375
See application file for complete search history.

(56) References Cited

U.S. PATENT DOCUMENTS

| 5,543,714 A | 8/1996 | Blanpain et al. ............... 324/345 |
| 6,765,383 B1 | 7/2004 | Barringer ...................... 324/330 |

(Continued)

FOREIGN PATENT DOCUMENTS

| GB | 2382875 A | * 11/2003 |
| JP | 2005530135 | 8/2002 |
| JP | 3657198 | 8/2008 |
| KR | 20000035860 | 6/2000 |
| WO | WO2006135510 | 12/2006 |

OTHER PUBLICATIONS

International Search Report dated Oct. 20, 2008 (PCT/US2008/068893).

(Continued)

*Primary Examiner* — Huy Q Phan
*Assistant Examiner* — Adam Clarke

(57) ABSTRACT

Method of determining electrical anisotropy in a subsurface formation, wherein electromagnetic field data from a multi-offset electromagnetic survey obtained by using an electromagnetic source and a plurality of electromagnetic receivers at varying offset distances from the source is provided. The electromagnetic field data comprises a first set of multi-offset response signals received at each receiver with the electromagnetic source emitting at a first frequency, and at least one additional set of multi-offset response signals received at each receiver with the electromagnetic source emitting at a different frequency. The presence of electrical anisotropy in the subsurface formation is determined using the first and at least one additional sets of multi-offset response signals. This may comprise comparing the first set and the at least one additional set of multi-offset response signals and determining the presence of electrical anisotropy in the subsurface formation from the comparison of the sets of multi-offset response signals.

8 Claims, 2 Drawing Sheets

U.S. PATENT DOCUMENTS

| | | | |
|---|---|---|---|
| 6,950,748 B2 | 9/2005 | Liu et al. ............................. | 702/7 |
| 7,191,063 B2 * | 3/2007 | Tompkins ......................... | 702/2 |
| 7,542,851 B2 * | 6/2009 | Tompkins ......................... | 702/2 |
| 7,705,598 B2 * | 4/2010 | Larsen ........................... | 324/326 |
| 7,769,553 B2 * | 8/2010 | Willen ............................ | 702/75 |
| 2003/0050759 A1 * | 3/2003 | Srnka et al. ...................... | 702/7 |
| 2004/0124842 A1 * | 7/2004 | Eidesmo et al. ............... | 324/337 |
| 2005/0237063 A1 * | 10/2005 | Wright et al. .................. | 324/336 |
| 2006/0132137 A1 * | 6/2006 | MacGregor et al. ........... | 324/334 |
| 2008/0309344 A1 * | 12/2008 | Larsen ........................... | 324/326 |
| 2009/0278541 A1 * | 11/2009 | Westerdahl et al. ........... | 324/334 |
| 2011/0280293 A1 * | 11/2011 | Chevalier et al. ............. | 375/224 |

OTHER PUBLICATIONS

S.E. Johansen et al, "Subsurface hydrocarbons detected by electromagnetic sounding", First Break, vol. 23, Mar. 2005.

MJ Tompkins et al; "Effects of vertical anisotropy on marine-active source electromagnetic data and inversions" EAGE 66 (Jun. 2004).

MJ Tompkins et al.; "Transversely isotropic 1-D Electromagnetic Inversion Scheme Requiring Minimal A-Priori Information" SEG 2002.

\* cited by examiner

US 8,482,287 B2

METHOD OF DETERMINING ELECTRICAL ANISOTROPY IN A SUBSURFACE FORMATION

PRIORITY CLAIM

The present application claims priority from PCT/US2008/068893, filed 1 Jul. 2008, which claims priority from U.S. Provisional Application 60/947,837 filed 3 Jul. 2007.

FIELD OF THE INVENTION

In one aspect, the present invention relates to a method of determining electrical anisotropy in a subsurface formation.

BACKGROUND OF THE INVENTION

The electrical resistivity of a subsurface earth formation can be strongly dependent on the direction of the current flow that experiences the resistivity. Often as a result of a finely layered structure of the rocks, the electrical resistivity in the vertical direction may typically be larger, typically by two or more times, than the electrical resistivity in a horizontal direction. This phenomenon is generally referred to as vertical electrical anisotropy. Even where individual sedimentary layers are electrically isotropic, the combined effect of many of such layers together may cause a "macrosopic" anisotropic behaviour.

WO 2006/135510 discloses a marine method for determining the earth vertical electrical anisotropy from an electromagnetic survey of a subsurface region located below the water bottom in an offshore environment. The survey uses an electromagnetic source and a plurality of electromagnetic receivers, with which electromagnetic field data is obtained at a plurality of receiver locations. Horizontal and vertical resistivities are calculated by solving Maxwell's electromagnetic field equations at a position in the subsurface formation, using survey acquisition parameters and the measured electromagnetic field data. A measure of the vertical anisotropy is obtained from the calculated horizontal and vertical resistivities.

A drawback of the method of WO 2006/135510 is that it requires multi-azimuth electromagnetic field data, obtained both online relative to a survey line of electromagnetic source positions and offline with respect to that survey line.

Moreover, the method requires the data to comprise at least two field components, one sensitive predominantly to vertical resistivity and one sensitive predominantly to horizontal resistivity.

Another drawback is that the method requires extensive inversion techniques.

SUMMARY OF THE INVENTION

In accordance with one aspect of the invention, there is provided a method of determining electrical anisotropy in a subsurface formation, comprising the steps of:
providing electromagnetic field data from a multi-offset electromagnetic survey obtained by using an electromagnetic source and a plurality of electromagnetic receivers at varying offset distances from the source, the electromagnetic source and plurality of electromagnetic receivers being located above the subsurface formation, the electromagnetic field data comprising a first set of multi-offset response signals received at each receiver with the electromagnetic source emitting at a first frequency, and at least one additional set of multi-offset response signals received at each receiver with the electromagnetic source emitting at a different frequency;
determining the presence of electrical anisotropy in the subsurface formation using the first and at least one additional sets of multi-offset response signals.

The last step may comprise comparing the first set and the at least one additional set of multi-offset response signals and determining the presence of electrical anisotropy in the subsurface formation from the comparison of the sets of multi-offset response signals.

The determined presence of electrical anisotropy may be outputted, for instance by displaying, storing or transmitting to another user.

The invention will hereinbelow be further illustrated in more detail, by way of example and with reference to the drawing.

DETAILED DESCRIPTION OF EMBODIMENTS

Existence of electrical anisotropy in subsurface formations, such as in horizontally layered sedimentary sequences, can have a profound effect on recorded electric fields of controlled source electromagnetic surveys and subsequent data interpretation. Applicant has discovered that controlled source electromagnetic (CSEM) data recorded at multiple frequencies can be useful for determining the presence of anisotropy in, for instance an overburden layer of, a subsurface formation. It has been discovered that anisotropy has a frequency-dependent effect that can be observed in field data when recorded at multiple frequencies.

It is not needed to provide multi-azimuth data; the anisotropy can be estimated even when multi-azimuth data is not available. This is advantageous, not only in view of saving cost for the electromagnetic survey, but also because it allows re-analysis of single-azimuth shelf data.

The survey may need fewer receivers than would be the case if also broadside data would be required such as is the case with the prior art method disclosed in WO 2006/135510.

Moreover, it is not needed to provide multi-component data. Therefore the survey may be taken with simple antenna configurations.

It has further been found that it is possible to use a simple 1D electromagnetic inversion method to quantify the anisotropy from multi-offset multi-frequency controlled source electromagnetic data.

Figure 1:
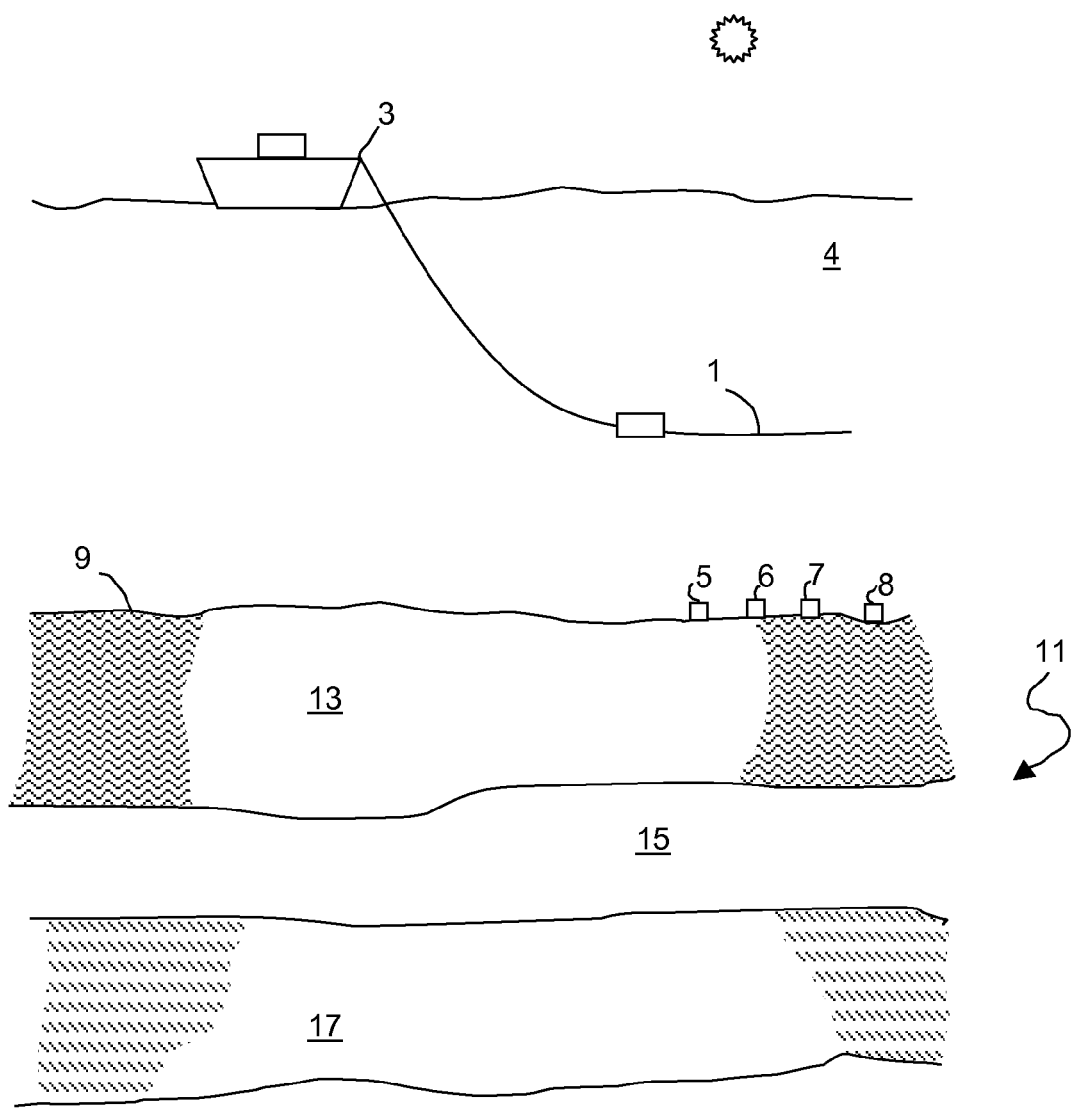
FIG. 1 schematically shows in cross section an impression of a marine controlled source electromagnetic survey geometry.

Reference is now made to FIG. 1, which shows a typical multi-offset electromagnetic survey geometry in a marine environment. In such a marine environment, a multi-offset electromagnetic survey may be made by deep-towing a submerged electromagnetic source 1 behind a ship 3 cruising on the sea 4, and recording electromagnetic signals with electromagnetic receivers 5, 6, 7, 8 that have been deployed at the sea bed 9 above the subsurface formation 11 that is being investigated. In the present example, the formation is assumed to contain an overburden 13, a mineral hydrocarbon fluid containing reservoir layer 15, and an underburden 17.

Although a marine environment is convenient for carrying out electromagnetic surveys, it is known to the person of ordinary skill in the art that such EM surveys may be made on land as well. The invention can be carried out using any electromagnetic field data from a multi-offset electromagnetic survey, independent of whether it has been gathered on land or in a marine environment.

The electromagnetic source may be of any type. However, a horizontal electromagnetic dipole source is commonly employed. The receivers may also be horizontal electromagnetic dipole receivers. The electromagnetic receivers 5 to 8 are positioned in an array along a survey line, at varying offset distances from the source 1.

Any suitable number of electromagnetic receivers may be used, depending, for instance, on available resources. The survey line may typically span over more than 1 km up to tens of km. In one survey, for instance, the survey line comprised 24 receivers spanning approximately 12 km (see S. E. Johansen et al, "Subsurface hydrocarbons detected by electromagnetic sounding", published in First Break Vol. 23, pp. 31-36, 2005). Optionally, the receivers are multi-component receivers.

In operation, the electromagnetic source may excite an electromagnetic signal at fairly low frequency, for instance between 0.01 Hz and 100 Hz, or, more typically, between about 0.1 Hz and about 10 Hz. This signal propagates through the seawater 4 and subsurface formations 11, and is perturbed by geologic variation present in the subsurface 11 to depths of several km. Due to the frequency regime and typical formation resistivity values, the electromagnetic energy is understood to diffuse in the formations. Electromagnetic energy resulting from the excitation is recorded at the seafloor receivers 5 to 8.

This way, a first set of multi-offset response signals are received at each receiver 5-8 with the electromagnetic source emitting at a first frequency, and at least one additional set of multi-offset response signals are received at each receiver with the electromagnetic source emitting at a different frequency. These signals together form electromagnetic field data. This data may be interpreted in terms of subsurface resistivity variations.

Ideally, CSEM surveys consist of data recorded for many source-receiver offsets, several frequencies, and at least two receiver components, inline (radial) and broadside (azimuthal) electric fields. The present invention is already enabled employing a plurality of source-receiver offsets and a plurality of signal frequencies. The rest is optional.

A contour plot showing calculated electric field amplitude distribution in a two-layer model of sea water and an isotropic earth formation was used to indicate the result of a numerical simulation of the electric field amplitude as a function of vertical depth (z) and horizontal offset (x) relative to an electromagnetic source.

The simulation was made for a two-layer model. The upper layer was taken to consist of sea water with an isotropic resistivity of 0.32 Ωm, and the lower layer represented an underlying earth formation in the form of an isotropic formation wherein both the horizontal resistivity, $\rho_h$, and the vertical resistivity, $\rho_v$, are 2.0 Ωm. The electromagnetic source was taken to be a horizontal electric dipole, positioned on the interface formed by the seafloor, and operated to emit an electromagnetic signal at a frequency of 2.25 Hz and polarized in the x direction.

The contour plot showed the computed variation in the electric field amplitude, in the earth and in the sea, as the field diffuses from the source through the earth and the sea. A horizontal line on the plot indicated the interface between the sea water and the earth formation, i.e. the sea floor. It was apparent from the plot that the electric fields decrease rapidly with depth and distance from the source. In fact, the magnitude of the electric fields varies by over 7 orders of magnitude over a distance of only 5 km. This is the primary reason why electric field measurements have limited depth sensitivity (top few kilometers of the earth). It is further observed that the electric field diffuses farther in the earth formation than in the sea. This is a result of the higher resistivity of the earth formation.

In order to illustrate how vertical anisotropy changes the nature of EM diffusion in the earth, the same experiment as that described above was simulated for a two layer model comprising of sea water (assuming a resistivity equal to that of the previous plot) and an anisotropic earth layer wherein $\rho_h$=2.0 Ωm and $\rho_v$=10 Ωm. The resulting calculated distribution of the magnitude of the electric field was plotted as a contour plot showing calculated electric field amplitude distribution in the two-layer model of sea water and an anisotropic earth formation. Again, a horizontal line indicated the sea floor.

Figure 2:
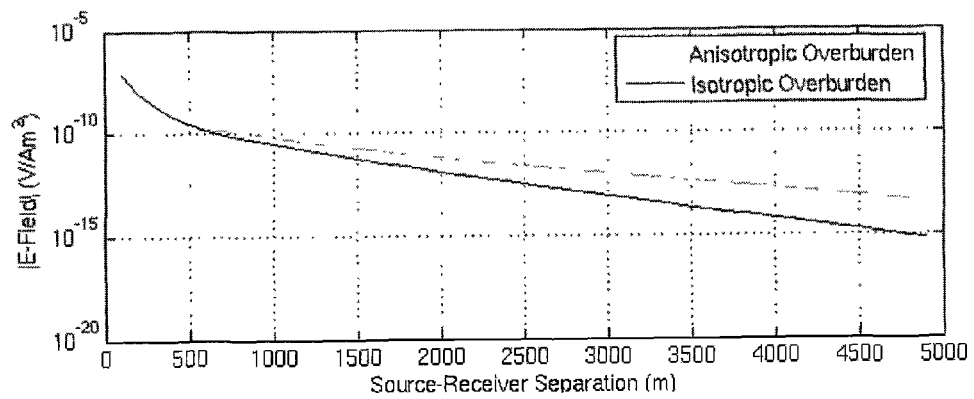
FIG. 2 is a graph showing a sea-floor receiver gather of the electric field amplitudes versus offset of the calculations of electric field amplitude distributions in a two-layer model of sea water and an isotropic earth formation and a two-layer model of sea water and an anisotropic earth formation.

FIG. 2 shows how the fields as calculated above would be recorded by an array of electromagnetic receivers located on the sea floor in a single survey line extending in-line relative to the direction of polarization of the electromagnetic source. Line 21 corresponds to the case of the first plot described above, namely an isotropic earth formation, while line 22 corresponds to the case of the second plot described above, namely an anisotropic earth formation. The graph of FIG. 2 is a so-called magnitude-versus-offset (MVO) plot, sometimes also referred to as a receiver gather, wherein the magnitude of the electromagnetic field is plotted versus horizontal distance (offset) from the electromagnetic source. The electromagnetic receivers were taken to be positioned at a regular interval from the electromagnetic source, to a maximum offset of 5 km. This represents a typical 2D in-line survey using only one data component ($E_x$).

It is clear from both the receiver gathers (lines 21 and 22 in FIG. 2) and the contoured electric field plots that the presence of anisotropy increases the electric field magnitudes considerably at all distances from the source. There is as much as a factor of 3 increase in the fields at offsets as small as 2500 m from the source.

A phenomenon underlying this enhancement of the electric fields in case of vertical anisotropy was seen in the plot of an anisotropic formation: the electric fields propagate preferentially by horizontal diffusion of currents in the vertically anisotropic earth. If the earth is vertically anisotropic, the currents are believed to diffuse more readily in the direction of least resistivity. In the case of vertical anisotropy, the least resistive directions are in the horizontal plane. Thus, the currents (and associated electric fields) in the plot of the anisotropic formation were channelled horizontally rather than diffusing equally in both horizontal and vertical directions as is believed to be the case in an isotropic formation.

In a sea floor receiver gather as exemplified in FIG. 2, the electric fields are recorded as a function of horizontal distance from the source at the sea floor. Vertical electrical anisotropy results in increase the fields at each receiver location relative (line 22) to measurements over isotropic sediments (line 21). This was also seen when one compared the value of the source-receiver offset where the "1.0 e-13 contour" intersected the seafloor in the two contour plots.

It turns out that the effects as revealed above are frequency dependent. This is demonstrated in FIG. 3, which shows MVO plots as computed for various source frequencies in the range of 0.05 Hz to 4.75 Hz, using a similar sea/earth models as the ones that underlie the FIG. 2, but wherein the sea water layer is only 300 m deep. Table I provides a legend to FIG. 3 explaining the calculation conditions for each of the lines 23i to 26i and 23a to 26a.

Figure 3:
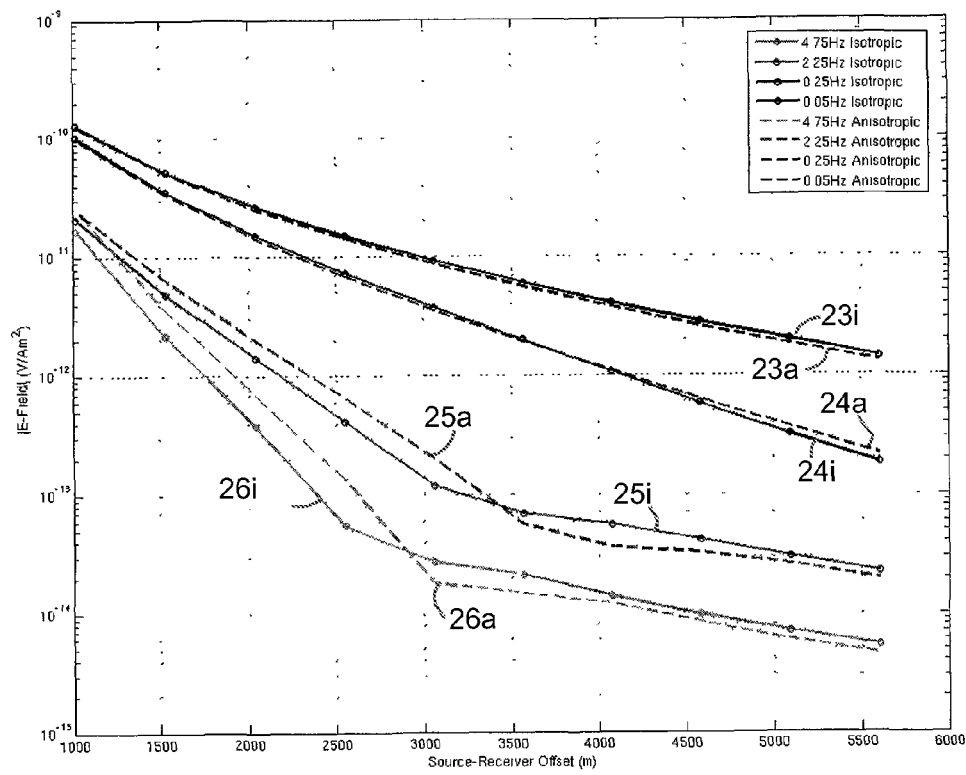
FIG. 3 is a graph showing sea-floor receiver gathers of the electric field amplitudes versus offset, comparing isotropic and anisotropic earth models for different frequencies.

TABLE I legend to FIG. 3

| Line number | Frequency (Hz) | Isotropic earth | Anisotropic earth |
|---|---|---|---|
| 23i | 0.05 | X | |
| 23a | 0.05 | | X |
| 24i | 0.25 | X | |
| 24a | 0.25 | | X |
| 25i | 2.25 | X | |
| 25a | 2.25 | | X |
| 26i | 4.75 | X | |
| 26a | 4.75 | | X |

It is clear from FIG. 3, that vertical electrical anisotropy has differing effects when measured at different frequencies. In particular the observed effect of anisotropy decreases with decreasing frequency and with increasing offset. The latter is thought to be a result of the contribution of the (isotropic) air wave to the response signals, which becomes more and more dominant for offsets larger than about 3 or 4 km in the case of only 300 m sea water.

The observation that the effect of anisotropy decreases with decreasing frequency is more general, and is believed to relate to the number of cycles that an electric field travels through before being received at the sea floor. A higher frequency signal travels through more cycles, and experiences relatively more horizontal diffusion, as compared to propagation in an isotropic earth formation.

FIGS. 2 and 3 demonstrate how an electrical anisotropy in the formation is detectable by comparing multi-offset electric field magnitude (or amplitude) data. Alternatively, or in addition thereto, multi-offset electric field phase data may be compared to determine the electrical anisotropy.

It is important to take the presence of electrical anisotropy into account when inverting the data. If one were to attempt to invert the multi-frequency data using isotropic earth models, he would find that the higher the frequency the more resistive the earth must be to fit the data. However, by acknowledging the correct electromagnetic anisotropy, the data can be described using constant values for horizontal and vertical resistivity.

The observed frequency dependence can thus be exploited to determine—from single-polarization multi-frequency data—whether anisotropy is present, even when multi-azimuth and/or multi-component data is not available.

When the earth model would include a resistive layer below the overburden, be it an isotropic or an anisotropic overburden, the electric fields at the seafloor are increased at each offset by as much as an order of magnitude. As is known to the person of ordinary skill in the art, a resistive layer acts to scatter energy back to the surface rather than allow further diffusion deeper in the earth. This effect, which is the basis for interpreting hydrocarbon presence, is measurable for layers as thin as a few meters at a kilometer or more in depth.

In order to properly estimate the overburden anisotropy, one could first include only near-offset data. Herewith, isotropic contributions of an airwave may be suppressed (in case of shallow water or land observations) or contributions to the signal of deeper lying resistivity features in the earth formation such as possible a high-resistive hydrocarbon bearing layer. For instance, the comparing of the first set and the at least one additional set of multi-offset response signals could be done using only the response signals corresponding to offset values of less than 5 km, preferably less than 3 km, or even less than 1.5 km. The result of this inversion could then be used as input for an inversion of the multi-offset data over a full range of offsets so as to include also response information from air wave and/or deeper layers in the earth formation.

It is remarked that controlled source electromagnetic surveys are typically acquired using EM sources that generate and emit signals comprising more than one frequency at the same time, such as harmonics of the fundamental frequency of transmission. The multi-frequency data can thus economically be obtained in one single survey, whereby the first and additional frequencies are selected to coincide with the frequencies that are emitted at the same time. Suitably, the first frequency may be the fundamental frequency of the emitted signal and the additional frequency may be a harmonic of the first frequency.

With the invention disclosed herein, typical geophysical imaging and inversion methods that attempt to reconstruct subsurface resistivity variations and determine hydrocarbon distributions may be applied without the need to rely on an assumption of electrical isotropy. It is anticipated that including the appropriate frequency dependence of electrical anisotropy is an improvement of inversion techniques that introduce merely minor computational burden.

The invention disclosed herein can be used to determine background electrical anisotropy, that can then in turn be incorporated into more sophisticated interpretation algorithms, including imaging and inversion algorithms, to better characterize the subsurface resistivity and find high-resistive regions that may be indicative of presence of hydrocarbon containing reservoirs.

Once such hydrocarbon-containing reservoirs have been identified, the hydrocarbon-fluids may be produced by providing a wellbore into the hydrocarbon reservoir using any method of drilling and completing a hydrocarbon production well known in the art.

It is contemplated that the present method may also be employed to determine non-vertical electrical anisotropy. For instance, in the case of horizontal anisotropy, due to the channeling effect the electromagnetic energy may be channelled more into the depth.

What is claimed is:

1. A method of determining electrical anisotropy in a subsurface formation, comprising the steps of:
providing electromagnetic field data from a multi-offset electromagnetic survey obtained by using an electromagnetic source and a plurality of electromagnetic receivers at varying offset distances from the source, the electromagnetic source and plurality of electromagnetic receivers being located above the subsurface formation, the electromagnetic field data comprising a first set of multi-offset response signals received at each receiver with the electromagnetic source emitting at a first frequency, and at least one additional set of multi-offset response signals received at each receiver with the electromagnetic source emitting at a different frequency;
comparing the first set and the at least one additional set of multi-offset response signals;

determining the presence of electrical anisotropy in the subsurface formation from the comparison of the first and at least one additional sets of multi-offset response signals;

wherein comparing the first set and the at least one additional set of multi-offset response signals comprises comparing both electric field amplitude attributes and phase attributes of the multi-offset response signals.

2. The method of claim 1, wherein the first and the at least one additional sets of response signals have been obtained with the electromagnetic source simultaneously emitting at the first and the different frequency.

3. The method of claim 2, wherein the first frequency is a fundamental frequency of the emitted signal and the different frequency is a harmonic of the first frequency.

4. The method of claim 1, wherein the electromagnetic field data comprises multi-offset response signals received with the electromagnetic source emitting at at least three frequencies.

5. The method of claim 1, wherein comparing the first set and the at least one additional set of multi-offset response signals comprises comparing only response signals corresponding to offset values of less than 5 km.

6. The method of claim 1, wherein comparing the first set and the at least one additional set of multi-offset response signals comprises comparing electric field amplitude attributes of the multi-offset response signals.

7. The method of claim 1, wherein comparing the first set and the at least one additional set of multi-offset response signals comprises comparing electric field phase attributes of the multi-offset response signals.

8. The method of claim 1 wherein the provided electromagnetic field data comprises single-component data.

* * * * *